United States Patent [19]

Miyoshi et al.

[11] 4,322,514
[45] Mar. 30, 1982

[54] PROCESS FOR PREPARING A COPOLYMER

[75] Inventors: Mituji Miyoshi, Kanagawa; Kazuo Matsuura, Kawasaki; Yoshio Tajima, Tokyo, all of Japan

[73] Assignee: Nippon Oil Company, Limited, Tokyo, Japan

[21] Appl. No.: 122,987

[22] Filed: Feb. 20, 1980

[30] Foreign Application Priority Data

Feb. 27, 1979 [JP] Japan ................... 54/21444

[51] Int. Cl.$^3$ .................. C08F 4/02; C08F 10/00
[52] U.S. Cl. ................... 526/124; 252/429 C; 526/125; 526/151; 526/348.3; 526/348.4; 526/348.6
[58] Field of Search .............. 526/124, 125, 151

[56] References Cited

U.S. PATENT DOCUMENTS

| | | | |
|---|---|---|---|
| 3,658,722 | 4/1972 | Delborutls et al. | 526/124 |
| 3,789,036 | 1/1974 | Longi et al. | 526/125 |
| 3,900,454 | 8/1975 | Sato et al. | 526/125 |
| 3,917,575 | 11/1975 | Matsuura | 526/125 |
| 4,056,668 | 11/1977 | Berger et al. | 526/125 |
| 4,065,611 | 12/1977 | Miyoshi et al. | 526/125 |
| 4,093,789 | 6/1978 | Kuroda et al. | 526/125 |
| 4,107,415 | 8/1978 | Giannini et al. | 526/125 |
| 4,113,654 | 9/1978 | Mayr et al. | 526/125 |
| 4,154,915 | 5/1979 | Matsuura et al. | 526/125 |
| 4,168,361 | 9/1979 | Oda et al. | 526/125 |

FOREIGN PATENT DOCUMENTS

| | | | |
|---|---|---|---|
| 2644440 | 4/1977 | Fed. Rep. of Germany | 526/125 |
| 1432988 | 4/1976 | United Kingdom . | |

*Primary Examiner*—Edward J. Smith
*Attorney, Agent, or Firm*—Wyatt, Gerber, Shoup, Scobey & Badie

[57] ABSTRACT

According to this invention, there is provided a process for preparing a non- or low-crystalline soft copolymer, characterized in that 50 to 98 mole % of propylene, 0.2 to 30 mole % of ethylene and 0.2 to 45 mole % of a straight-chained α-olefin having not less than four carbon atoms are copolymerized using a catalyst, said catalyst comprising (1) a solid substance containing magnesium and titanium and (2) an organometallic compound.

11 Claims, No Drawings

PROCESS FOR PREPARING A COPOLYMER

BACKGROUND OF THE INVENTION

1. Field of the Invention

This invention relates to a process for preparing a non- or low-crystalline copolymer of high transparency by copolymerizing ethylene, propylene and a straight-chained α-olefin having not less than four carbon atoms.

2. Description of the Prior Art

As a soft or semi-hard resin, polyvinyl chloride has heretofore been known, and in recent years copolymers consisting primarily of ethylene have also come to be known. As to a soft or semi-hard copolymer consisting primarily of propylene, however, various proposals have been made but have not been put to practical use yet.

Recently proposed is a process for preparing a soft or semi-hard copolymer by random copolymerization of propylene and butene-1 (see Japanese Patent Public Disclosure No. 79984/78). According to this process, however, the crystallinity of the resulting copolymer is still high, so a copolymer of lower or non-crystallinity has been keenly desired.

As to a process for preparing a terpolymer of ethylene, propylene and an α-olefin having not less than four carbon atoms, there are known processes, for example, those disclosed in Japanese Patent Public Disclosures Nos. 79195/76 and 26883/78. All these processes, however, employ a catalyst comprising the combination of a $TiCl_3$-containing component and an organoaluminum compound to prepare a crystalline terpolymer. They are disadvantageous in that a soft or semi-hard copolymer is not obtainable.

SUMMARY OF THE INVENTION

Having made extensive studies to obtain a non- or low-crystalline soft copolymer of high transparency, we accomplished this invention.

That is, this invention provides a process for preparing a non- or low-crystalline soft copolymer of high transparency by copolymerizing 50 to 98 mole % of propylene, 0.2 to 30 mole % of ethylene and 0.2 to 45 mole % of a straight-chained α-olefin having not less than four carbon atoms in the presence of a catalyst, which catalyst comprises (1) a solid substance containing magnesium and titanium and (2) an organometallic compound.

DESCRIPTION OF THE INVENTION

This invention is described below more in detail.

The catalyst used in the invention comprises the combination of (1) a solid substance containing magnesium and titanium and (2) of organometallic compound. Examples of such solid substance are those obtained by attaching, in known manner, a titanium compound to inorganic solid carriers such as metallic magnesium, magnesium hydroxide, magnesium carbonate, magnesium oxide and magnesium chloride; also double salt, double oxide, carbonate, chloride and hydroxide which contain a metal selected from silicon, aluminum and calcium, and magnesium atom; and further these inorganic solid carriers treated or reacted with a hydrocarbon or a halogen-containing substance.

As the hydrocarbon just referred to above, aromatic hydrocarbons are preferred, e.g. durene, anthracene and naphthalene. As the halogen-containing substance also just referred to above, halogenated hydrocarbons are preferred, e.g. 1,2-dichloroethane, n-butyl chloride, t-butyl chloride, and p-chlorobenzene.

Examples of other solid substances which may be suitably used in this invention are reaction products of organomagnesium compounds, e.g. so-called Grignard compounds, and titanium compounds. As organomagnesium compounds there may be used, for example, those represented by the general formulae $RMgX$, $R_2Mg$, and $RMg(OR)$ wherein R is an organic radical having 1 to 20 carbon atoms and X is halogen, and also these organomagnesium compounds after modification with various other organometallic compounds, e.g. organosodium, organolithium, organopotassium, organoboron, organocalcium and organozinc.

By way of illustrating titanium compounds which may be used in the invention, mention may be made of halides, alkoxyhalides, alkoxides, oxides and halogenated oxides of tetrevelent titanium or trivalent titanium. Preferable tetravelent titanium compounds are the compounds represented by the general formula $Ti(OR)_nX_{4-n}$ wherein R is an alkyl, alkenyl, aryl or aralkyl group having 1 to 20 carbon atoms, preferably 1 to 8 carbon atoms, X is halogen and n is a whole number of from 0 to 4. Examples of the tetravelent titanium compounds are titanium tetrachloride, titanium tetrabromide, titanium tetraiodide, methoxytitanium trichloride, methoxytitanium tribromide, dimethoxytitanium dichloride, dimethoxytitanium dibromide, trimethoxytitanium chloride, titanium tetramethoxide, ethoxytitanium trichloride, ethoxytitanium tribromide, diethoxytitanium dichloride, diethoxytitanium dibromide, triethoxytitanium chloride, titanium tetraethoxide, isopropoxytitanium trichloride, isopropoxytitanium tribromide, diisopropoxytitanium dichloride, triisopropoxytitanium chloride, titanium tetraisopropoxide, t-butoxytitanium trichloride, di-t-butoxytitanium dichloride, tri-t-butoxytitanium chloride, titanium tetra-t-butoxide, n-pentoxytitanium trichloride, di-n-pentoxytitanium dichloride, n-hexoxytitanium trichloride, phenoxytitanium trichloride, diphenoxytitanium dichloride, triphenoxytitanium chloride, titanium tetraphenoxide, reaction product of $SiCl_4$ and the compound $Ti(OR)_nX_{4-n}$ and mixtures thereof.

Trivalent titanium compounds employed in the present invention are not specially restricted. Among these may be mentioned titanium trihalides obtained by reducing titanium tetrahalides with hydrogen, aluminum, titanium or an organometallic compound of a metal of the groups I to III of the Periodic Table. Preferable titanium trihalides are $TiCl_3$, $TiCl_3 \cdot \frac{1}{3}AlCl_3$ and $TiBr_3$. Trivalent titanium compounds except titanium trihalides may be obtained by reducing various tetravelent titanium alkoxyhalides represented by the general formula $Ti(OR)_mX_{4-m}$ wherein R is an alkyl, alkenyl, aryl or aralkyl group having 1 to 20 carbon atoms, X is halogen and m is a whole number of from 1 to 4, with an organometallic compound of a metal of the groups I to III of the Periodic Table, at a temperature of from $-80°$ C. to $200°$ C., preferable $0°$ C. to $100°$ C. and molar ratio of titanium alkoxyhalide to organometallic compound being in the range of from 1:5 to 5:1, preferably 1:2 to 2:1.

A titanium compound may be attached to an inorganic solid carrier, for example, by copulverization of the two, or by contact of the titanium compound in liquid phase with the inorganic solid carrier.

The apparatus to be used for such copulverization is not specially limited, but usually employed are ball mill, vibration mill, rod mill, and impact mill. Pulverization conditions such as pulverization temperature and time can be decided easily by those skilled in the art according to the pulverization method adopted. Generally, the pulverization temperature may range from 0° to 50° C. and the pulverization time from 0.5 to 50 hours, preferably from 1 to 30 hours.

In the case of contacting a titanium compound in liquid phase, there may be contacted a liquid titanium as it is or in an inert solvent such as hexane or heptane at a reaction temperature of 0° to 150° C., then the solid component is separated and washed with an inert solvent to give a solid component to be used in the invention.

To illustrate such solid substance, mention may be made of the following as typical examples (in the following formulae R represents an organic radical and X represents halogen): $MgO-RX-TiCl_4$ system (see Japanese Patent Publication No. 3514/76), $MgCl_2-Al(OR)_3-TiCl_4$ system (see Japanese Patent Publications Nos. 152/76 and 15111/77), $MgCl_2$—aromatic hydrocarbon—$TiCl_4$ system (see Japanese Patent Publication No. 48915/77), $Mg(OOCR)_2-Al(OR)_3-TiCl_4$ system (see Japanese Patent Publication No. 11710/77), $MgCl_2-RX-TiCl_4$ system (see Japanese Patent Public Disclosure No. 42584/77), $Mg-POCl_3-TiCl_4$ system (see Japanese Patent Publication No. 153/76), $MgCl_2-AlOCl-TiCl_4$ system (see Japanese Patent Public Disclosure No. 133386/76), and $RMgX-TiCl_4$ system (see Japanese Patent Publication No. 39470/75).

As organometallic compounds used in the invention there may be employed those of Group I-IV metals of the Periodic Table, which are known as one component of a Ziegler catalyst. Above all, organoaluminum compounds and organozinc compounds are preferred. Examples are organoaluminum compounds represented by the general formulae $R_3Al$, $R_2AlX$, $RAlX_2$, $R_2AlOR$, $RAl(OR)X$ and $R_3Al_2X_3$ wherein R, which may be same or different, is an alkyl or aryl group of $C_1$ to $C_{20}$ and X is halogen, and organozinc compounds represented by the general formula $R_2Zn$ wherein R, which may be same or different, is an alkyl group of $C_1$ to $C_{20}$, such as triethylaluminum, triisobutylaluminum, trihexylaluminum, trioctylaluminum, diethylaluminum chloride, ethylaluminum sesquichloride, diethylzinc, and mixtures thereof.

In this invention the amount of an organometallic compound to be used is not specially limited, but usually may range from 0.1 to 1000 moles per mole of a titanium compound.

The amount of a titanium compound to be used in the invention is preferably adjusted so that the titanium content of the resulting solid component is in the range of from 0.5 to 10% by weight. The range of 1 to 8% by weight is specially preferred in order to attain well-balanced activity per titanium and that per solid.

This invention is to copolymerize, using the foregoing catalyst, 50-98 mole % of propylene, 0.2 to 30 mole % of ethylene and 0.2 to 45 mole % of a straight-chained α-olefin having not less than four carbon atoms, whereby there is obtained a non- or low-crystalline soft copolymer of high transparency.

In this invention, if copolymerization is carried out at the composition ratio of 50-80 mole % propylene, 2-30 mole % ethylene and 2-45 mole % straight-chained α-olefin of $C_4$ or more, there is obtained an extremely soft copolymer. If the composition ratio is 80-90 mole % propylene, 1-15 mole % ethylene and 1-15 mole % straight-chained α-olefin of $C_4$ or more, there is obtained a suitably soft copolymer. And at the composition ratio of 90-98 mole % propylene, 0.2-9 mole % ethylene and 0.2-9 mole % straight-chained α-olefin of $C_4$ or more, not only there is obtained a sufficiently soft copolymer, but also there is brought about an economic advantage such that there may be used less amount of the expensive straight-chained α-olefin of $C_4$ or more.

It goes without saying that propylene, ethylene and a straight-chained α-olefin of $C_4$ or more should be used within the respective composition ratios so that the total amount is 100 mole %.

Thus, in this invention there can be obtained soft copolymers according to the purpose of use by suitably changing the composition ratio of propylene, ethylene and a straight-chained α-olefin of $C_4$ or more.

Copolymers prepared according to this invention have a melting point based on DSC of 40° to 140° C. and a Haze value after pressing of not larger than 40% measured by the method defined in JIS K 6714. They are further characterized by being suitably soft with a Shore A hardness (JIS) usually ranging from 30 to 98.

As previously described, the catalyst used in the invention comprises (1) a solid substance containing magnesium and titanium and (2) an organometallic compound. In this invention it is desirable that a part or the whole of such catalyst be not modified or treated with an electron donating compound such as alcohol, ether or ester. If the said catalyst is treated with such an electron donating compound, the resulting copolymer becomes harder than in the case of non-treatment therewith. Also from the standpoint of catalyst activity, the catalyst not treated with such an electron donating compound exhibits a higher activity.

In this invention, moreover, even if boiling n-heptane insoluble matters are contained, say 20 wt. % or less, in the resulting copolymer, it is not necessary at all to remove them. That is, copolymers prepared according to this invention always exhibit superior properties, including a high transparency, even if boiling n-heptane insoluble matters are not removed. As previously noted, moreover, copolymers obtained according to this invention have various characteristics, that is, have a good processability and are especially superior in transparency, blocking resistance, heat-sealing property and flexibility, and so are suitable for molding into various products, including films, sheets and hollow containers. Furthermore, by blending with various thermoplastic resins, such as high-, medium- and low-density polyethylenes, polypropylene, polybutene, poly-4-methylpentene-1, and polystyrene, copolymers prepared according to this invention can improve strength, impact resistance, transparency and low-temperature characteristics, and thus can also be used as a resin modifier.

In case the composition ratio of ethylene, propylene and a straight-chained α-olefin of $C_4$ or more is outside the range specified herein, it is impossible to obtain such superior copolymers as in this invention.

By way of illustrating straight-chained α-olefins having not less than four carbon atoms which may be used in this invention, mention may be made of straight-chained α-olefins having 4 to 18 carbon atoms such as butene-1, pentene-1, hexene-1, heptene-1, octene-1, nonene-1, and dodecene-1. Also, these olefins may be used as mixtures.

The copolymerization reaction using the catalyst of this invention is carried out in the same manner as in the conventional olefin polymerization reaction using a Ziegler catalyst. That is, the reaction is performed in a substantially oxygen- and water-free condition and in vapor phase, or in the presence of an inert solvent or with monomer itself as solvent. The polymerization conditions involve temperatures ranging from 20° to 300° C., preferably from 40° to 180° C., and pressures ranging from atmospheric pressure to 70 kg/cm$^2$·G, preferably from 2 to 60 kg/cm$^2$·G. The molecular weight can be adjusted to some extent by changing the polymerization conditions such as polymerization temperature and the molar ratio of catalyst, but the addition of hydrogen into the polymerization system is more effective for this purpose. Of course, two or more stage polymerization reactions involving different polymerization conditions such as different hydrogen concentrations and different polymerization temperatures can be done without any trouble using the catalyst of this invention.

DESCRIPTION OF PREFERRED EMBODIMENTS

Working examples of this invention are given below, but it is to be understood that these examples are for illustration only to work the invention and are not intended to limit the invention.

EXAMPLE 1

(1) Catalyst Preparation 10 g. of anhydrous magnesium chloride and 0.5 ml. of 1,2-dichloroethane were placed in a stainless steel pot having a content volume of 400 ml. and containing 25 stainless steel balls each ½ inch in diameter, and a ball milling was done for 16 hours at room temperature in a nitrogen atmosphere. Then after adding 1.8 g. of titanium tetrachloride, ball milling was again performed for 16 hours at room temperature in a nitrogen atmosphere. The resulting solid power contained 39 mg. of titanium per gram thereof.

(2) Polymerization 20 g. of dried polyethylene powder, a suspension containing 120 mg. of the above solid powder in 12 ml. of n-hexane, and 2 mmol of triethylaluminum, were placed in a 2 liter stainless steel autoclave with an induction stirrer adjusted to 50° C. Hexane was distilled off with stirring under reduced pressure, then a mixed gas of 90 mole % propylene, 5 mole % 1-butene and 5 mole % ethylene was introduced until the total pressure was 5 kg/cm$^2$·G, under which condition polymerization was started. The polymerization was continued for 2 hours while the mixed gas was introduced continuously to maintain the total pressure at 5 kg/cm$^2$·G. As a result, there was obtained 120 g. of a newly produced copolymer with the polyethylene powder initially fed to the autoclave subtracted.

The catalyst activity was 25,000 g.polymer/g.Ti, and the copolymer thus prepared had the following physical properties.

| | |
|---|---|
| Shore A hardness (JIS) | 97 |
| Haze (0.5 mm sheet) | 11.5% |
| Boiling n-heptane insoluble portion | 11 wt. % |

From the above it is seen that the copolymer prepared in this Example is softer than that obtained in Comparative Example 1 below.

COMPARATIVE EXAMPLE 1

20 g. of dried polyethylene powder, a suspension containing 120 mg. of the solid powder obtained in Example 1 in 12 ml. of n-hexane, 2 mmol of triethylaluminum and 0.7 mmol of ethyl benzoate were placed in a 2 liter stainless steel autoclave with an induction stirrer adjusted to 50° C., and polymerization was carried out under the same conditions as in Example 1 to yield 105 g. of copolymer.

The catalyst activity was 21,875 g.polymer/g.Ti, and the copolymer thus prepared had the following physical properties.

| | |
|---|---|
| Shore C hardness (JIS) | 80 |
| Haze (0.5 mm sheet) | 18% |
| Boiling n-heptane insoluble portion | 11 wt. % |

EXAMPLE 2

A 2 liter stainless steel autoclave with an induction stirrer was purged with nitrogen, in which was then placed 500 ml. of hexane. Further added were 2 mmol of triethylaluminum and 120 mg. of the solid powder obtained in Example 1, and the temperature was raised to 70° C. with stirring. The system, which was pressurized to 1.0 kg/cm$^2$·G due to the vapor pressure of hexane, was further pressurized with a mixed gas of 80 mole % propylene, 10 mole % 1-butene and 10 mole % ethylene until the total pressure was 5 kg/cm$^2$·G, under which condition polymerization was started. The polymerization was continued for 2 hours while the mixed gas was introduced continuously to maintain the total pressure at 5 kg/cm$^2$·G, to yield 170 g. of copolymer.

The catalyst activity was 35,420 g.polymer/g.Ti, and the copolymer thus prepared had the following physical properties.

| | |
|---|---|
| Melting point | 90° C. |
| Shore A hardness (JIS) | 85 |
| Haze (0.5 mm sheet) | 9% |
| Boiling n-heptane insoluble portion | 2.3 wt. % |

EXAMPLE 3

Polymerization was carried out in the same manner as in Example 2 except that the composition of the mixed gas was changed into 60 mole % propylene, 30 mole % 1-butene and 10 mole % ethylene, to yield 143 g. of copolymer.

The catalyst activity was 29,800 g.polymer/g.Ti, and the copolymer thus prepared had the following physical properties.

| | |
|---|---|
| Melting point | 75° C. |
| Shore A hardness (JIS) | 78 |
| Haze (0.5 mm sheet) | 8% |
| Boiling n-heptane insoluble portion | 1.8 wt. % |

EXAMPLE 4

Polymerization was carried out in the same manner as in Example 2 except that the composition of the mixed gas was changed into 50 mole % propylene, 20 mole % 1-butene and 30 mole % ethylene, to yield 158 g. of copolymer.

The catalyst activity was 32,920 g.polymer/g.Ti, and the copolymer thus prepared had the following physical properties.

| Melting point | 80° C. |
|---|---|
| Shore A hardness (JIS) | 70 |
| Haze (0.5 mm sheet) | 13% |
| Boiling n-heptane insoluble portion | 1.0 wt. % |

EXAMPLE 5

Polymerization was carried out in the same manner as in Example 2 except that the composition of the mixed gas was changed into 70 mole % propylene, 5 mole % "Dialen" ($\alpha$-olefin of $C_6$ to $C_{10}$, a product of Mitsubishi Kasei Co.) and 25 mole % ethylene, to yield 101 g. of copolymer.

The catalyst activity was 21,040 g.polymer/g.Ti, and the copolymer thus prepared had the following physical properties.

| Melting point | 80° C. |
|---|---|
| Shore A hardness (JIS) | 69 |
| Haze (0.5 mm sheet) | 9% |
| Boiling n-heptane insoluble portion | 1.9 wt. % |

We claim:

1. A process for preparing a non- or low-crystalline soft polymer, characterized in that 80 to 98 mol % of propylene, 0.2 to 15 mol % of ethylene and 0.2 to 15 mole % of a straight-chained $\alpha$-olefin having not less than four carbon atoms are copolymerized using an electron donor free catalyst comprising (1) a solid substance containing magnesium and titanium and (2) organometallic compound.

2. A process according to claim 1, in which said solid substance consists of a titanium compound attached to an inorganic solid carrier; said inorganic solid carrier being metallic magnesium, magnesium hydroxide, magnesium carbonate, magnesium oxide, magnesium chloride, or a double salt, double oxide, carbonate, chloride or hydroxide containing a metal selected from silicon, aluminum and calcium, and magnesium atom.

3. A process according to claim 2, in which said inorganic solid carrier is treated or reacted with a hydrocarbon or a halogen-containing substance before attachment thereto the titanium compound.

4. A process according to claim 3, in which said hydrocarbon is an aromatic hydrocarbon and said halogen-containing substance is a halogenated hydrocarbon.

5. A process according to claim 1, in which said solid substance is the reaction product of an organomagnesium compound and a titanium compound.

6. A process according to claim 1, in which said organometallic compound is an organoaluminum compound or an organozinc compound.

7. A process according to claim 1, in which said organometallic compound is used in an amount of 0.1 to 1000 moles per mole of the titanium compound.

8. A process according to claim 1, in which said straight-chained $\alpha$-olefin having not less than four carbon atoms is a straight-chained $\alpha$-olefin of $C_4$ to $C_{18}$.

9. A process according to claim 1, in which said straight-chained $\alpha$-olefin is butene-1, pentene-1, hexene-1, heptene-1, octene-1, nonene-1, or dodecene-1.

10. A process according to claim 1, in which the copolymerization is carried out at a temperature in the range of from 20° to 300° C. and at a pressure in the range of from atmospheric pressure to 70 kg/cm$^2$·G.

11. A process according to claim 1, in which the copolymerization is carried out in the presence of hydrogen.

* * * * *